(12) United States Patent
Mukai et al.

(10) Patent No.: US 11,495,833 B2
(45) Date of Patent: Nov. 8, 2022

(54) CYLINDRICAL BATTERY

(71) Applicants: SANYO Electric Co., Ltd., Daito (JP); Panasonic Corporation, Kadoma (JP)

(72) Inventors: Natsuhiko Mukai, Osaka (JP); Satoshi Yamamoto, Osaka (JP); Masaki Deguchi, Hyogo (JP); Taisuke Yamamoto, Nara (JP); Atsushi Ueda, Osaka (JP); Masanobu Takeuchi, Osaka (JP)

(73) Assignees: SANYO Electric Co., Ltd., Daito (JP); PANASONIC HOLDINGS CORPORATION, Kadoma (JP)

( * ) Notice: Subject to any disclaimer, the term of this patent is extended or adjusted under 35 U.S.C. 154(b) by 0 days.

(21) Appl. No.: 17/044,033

(22) PCT Filed: Apr. 2, 2019

(86) PCT No.: PCT/JP2019/014647
§ 371 (c)(1),
(2) Date: Sep. 30, 2020

(87) PCT Pub. No.: WO2019/194182
PCT Pub. Date: Oct. 10, 2019

(65) Prior Publication Data
US 2021/0210792 A1 Jul. 8, 2021

(30) Foreign Application Priority Data
Apr. 6, 2018 (JP) .............................. JP2018-073840

(51) Int. Cl.
*H01M 10/0587* (2010.01)
*H01M 50/528* (2021.01)
(Continued)

(52) U.S. Cl.
CPC ......... *H01M 10/0587* (2013.01); *H01M 4/70* (2013.01); *H01M 10/0422* (2013.01);
(Continued)

(58) Field of Classification Search
CPC ......... H01M 10/0422; H01M 10/0587; H01M 4/70; H01M 2004/026; H01M 50/107; H01M 50/545; H01M 50/559
See application file for complete search history.

(56) References Cited

U.S. PATENT DOCUMENTS 6,143,442 A   11/2000   Takahashi et al.
6,391,490 B1   5/2002   Aoi et al.
(Continued)

FOREIGN PATENT DOCUMENTS

JP   10-21953 A    1/1998
JP   10-340709 A   12/1998
(Continued)

OTHER PUBLICATIONS

Machine translation of specification of JP2001093506A (Year: 2001).*
(Continued)

*Primary Examiner* — William E McClain
*Assistant Examiner* — Jason Barton
(74) *Attorney, Agent, or Firm* — WHDA, LLP (57) ABSTRACT

A battery comprises a first polarity terminal that is attached via a first insulating member to an opening of an outer case. A first polarity plate includes: a first core formed of a conductive material; and a first active material layer. A first drawn-out portion is formed from a side of the first core on the first polarity terminal side thereof being drawn further out than a side of the first active material layer on the first polarity terminal side thereof. The first drawn-out portion includes a first bent portion that is bent towards the radially (Continued)

inner or outer side of the electrode body. A first surface of a first polarity collector plate contacts the surface of the first bent portion on the first polarity terminal side, and the first polarity terminal connects directly or via a conductive member to a second surface of the first polarity collector plate.

4 Claims, 5 Drawing Sheets

(51) Int. Cl.
*H01M 50/531* (2021.01)
*H01M 4/70* (2006.01)
*H01M 10/04* (2006.01)
*H01M 4/02* (2006.01)

(52) U.S. Cl.
CPC ....... *H01M 50/528* (2021.01); *H01M 50/531* (2021.01); *H01M 2004/026* (2013.01)

(56) References Cited

U.S. PATENT DOCUMENTS

| | | | |
|---|---|---|---|
| 2005/0142436 A1 | 6/2005 | Arai et al. | |
| 2006/0019158 A1 | 1/2006 | Mori et al. | |
| 2013/0316209 A1* | 11/2013 | Masumoto | H01M 50/183 29/623.2 |
| 2017/0324117 A1 | 11/2017 | Morisawa et al. | |

FOREIGN PATENT DOCUMENTS

| | | | | |
|---|---|---|---|---|
| JP | 11-329398 A | 11/1999 | | |
| JP | 2000-228174 A | 8/2000 | | |
| JP | 2001-93506 A | 4/2001 | | |
| JP | 2001-148238 A | 5/2001 | | |
| JP | 2005-209638 A | 8/2005 | | |
| JP | 2006-32298 A | 2/2006 | | |
| NO | 2016/084288 A1 | 6/2016 | | |
| WO | WO-0039868 A1 * | 7/2000 | .......... | H01M 10/286 |
| WO | WO-2014068870 A1 * | 5/2014 | ........ | H01M 10/0422 |

OTHER PUBLICATIONS

Machine translation of specification of WO2014068870A1 (Year: 2014).*

Second and Supplementary Notice Informing the Applicant of the Communication of The International Application (Form PCT/IB/308) issued in counterpart International Application No. PCT/JP2019/014647 dated Aug. 6, 2020. (1 page).

Notification Concerning Transmittal of International Preliminary Report on Patentability (Forms PCT/IB/326) issued in counterpart International Application No. PCT/JP2019/014647 dated Oct. 15, 2020 with Forms PCT/IB/373 and PCT/ISA/237. (10 pages).

International Search Report dated Jul. 9, 2019, issued in counterpart International Application No. PCT/JP2019/014647, with English Translation. (4 pages).

Office Action dated Apr. 18, 2022, issued in counterpart CN Application No. 201980023625.0, with English translation. (16 pages).

* cited by examiner

CYLINDRICAL BATTERY

TECHNICAL FIELD

The present disclosure relates to a cylindrical battery including a wound electrode body.

BACKGROUND

Batteries such as cylindrical non-aqueous electrolyte secondary batteries each include a wound electrode body including a positive electrode and a negative electrode spirally wound with a separator therebetween, and are formed by the electrode body being accommodated in an outer covering body. Respective collector leads are connected to the positive electrode plate and the negative electrode plate included in the electrode body, and the positive electrode plate and the negative electrode plate are connected to, e.g., a sealing body and an outer covering can via the collector leads, respectively.

However, where collector leads are used, respective paths of connection with the electrode plates are small and internal resistance of the battery is thus likely to be high. In order to lower the internal resistance of the battery, as in the configuration described in Patent Literature 1, joining a collector plate to an edge of an electrode plate at an end surface of the electrode body is conceivable. In this configuration, an edge of a core portion of a positive electrode plate in a nickel-cadmium battery projects to the opening side of an outer covering body relative to the other part of an electrode body and a positive-electrode collector plate is joined to the edge via resistance welding. The positive-electrode collector plate is connected to a sealing body of the outer covering body, the sealing body closing the opening of the outer covering body.

CITATION LIST

Patent Literature

Patent Literature 1: JP 2006-32298 A

SUMMARY

Technical Problem

The configuration described in Patent Literature 1 can be considered effective where a thick and high-rigidity core is used, like a nickel-cadmium battery. However, where a thin and low-rigidity core is used, like a non-aqueous electrolyte secondary battery, a collector plate and the core may fail to be joined in a favorable manner Therefore, reduction of internal resistance on the positive electrode side in a configuration in which a core of a positive electrode plate is thin and low in rigidity is desired. Also, reduction of internal resistance on the negative electrode side in a configuration in which a core of a negative electrode plate is thin and low in rigidity is desired.

It is an advantage of the present disclosure to reduce internal resistance in a cylindrical battery having a configuration in which a core of a first electrode plate, that is one of a positive electrode plate and a negative electrode plate, is thin and low in rigidity.

Solution to Problem

A cylindrical battery according to the present disclosure is a cylindrical battery including: a wound electrode body including at least one first electrode plate and at least one second electrode plate that are wound with a separator therebetween; a bottomed cylindrical outer covering can that accommodates the electrode body; and a first pole terminal attached to an opening portion of the outer covering can via a first insulating member so as to close the opening portion, wherein the first electrode plate includes a first core being formed of a conductive material and a first active material layer formed on the first core, an edge portion of the first core on a first pole terminal side is led out relative to an edge of the first active material layer on the first pole terminal side and thereby forms a first lead-out portion, the first lead-out portion includes a first bent portion bent toward a radially inner side or a radially outer side of the electrode body, and a first surface of the first-electrode collector plate is in contact with a surface of the first bent portion on the first pole terminal side, and the first pole terminal is connected to a second surface of the first-electrode collector plate directly or via a conductive member.

Advantageous Effects of Invention

The cylindrical battery according to the present disclosure enables a reduction in internal resistance in a configuration in which a core of a first electrode plate is thin and low in rigidity.

DESCRIPTION OF EMBODIMENTS

An embodiment of the present disclosure will be described in detail below with reference to the accompanying drawings. In the below description, specific shapes, materials, numeric values, directions, etc., are examples for ease of understanding of the present disclosure and can be appropriately changed according to the specifications of the battery. Also, in the following, the term "substantially" is used with a meaning that includes, for example, a case that can be regarded as substantially the same, in addition to a case that is completely the same. Furthermore, where a plurality of embodiments and alterations are included in the following, it is originally assumed that feature parts of the embodiments and alterations are appropriately used in combination.

Also, in the following, a case where a battery is a cylindrical non-aqueous electrolyte secondary battery will be described. However, the battery is not limited to that of this case but may be another secondary battery or a primary battery.

Figure 1:
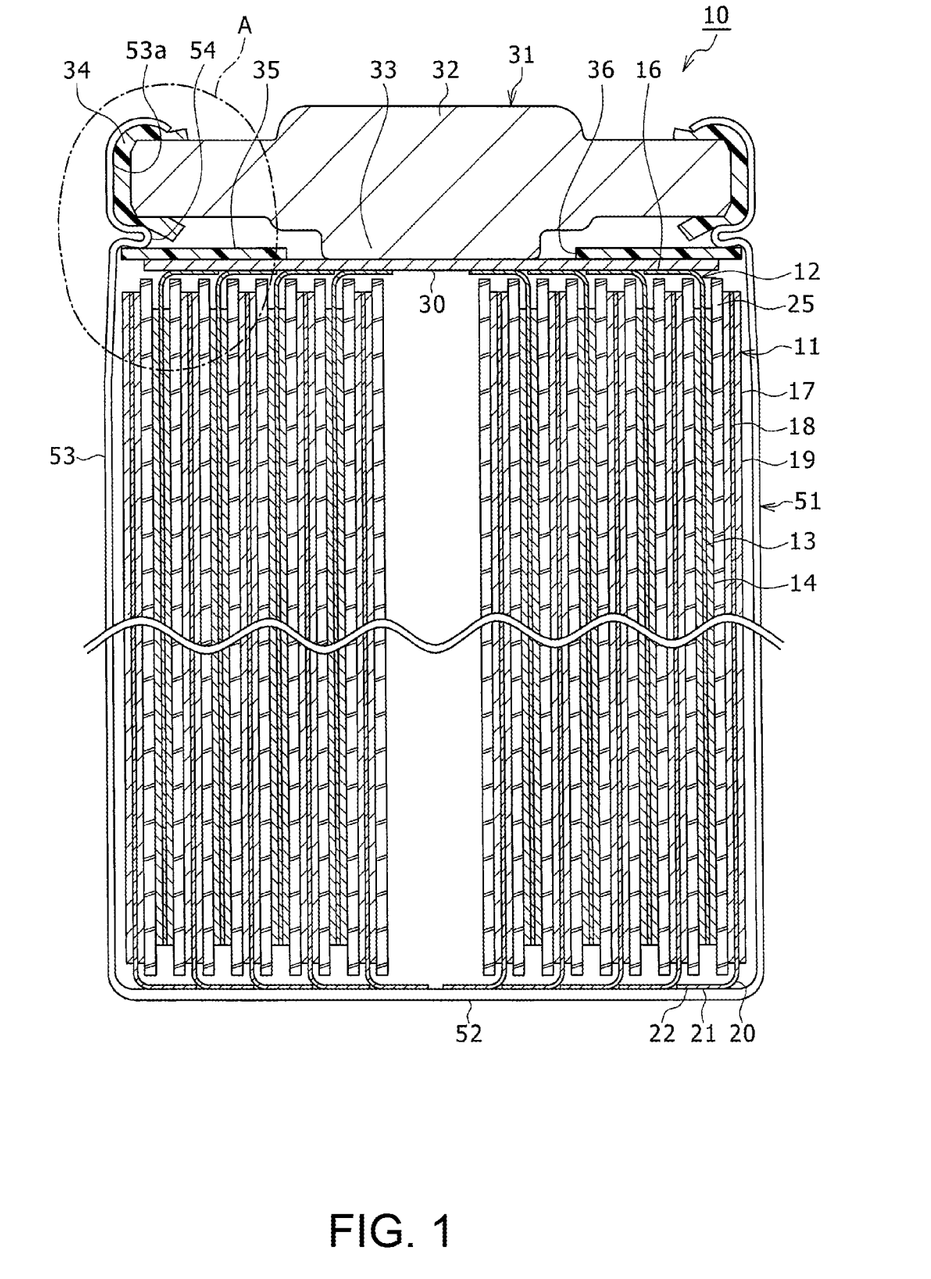
FIG. 1 is a sectional view of a cylindrical battery of an example of an embodiment.
Figure 2:
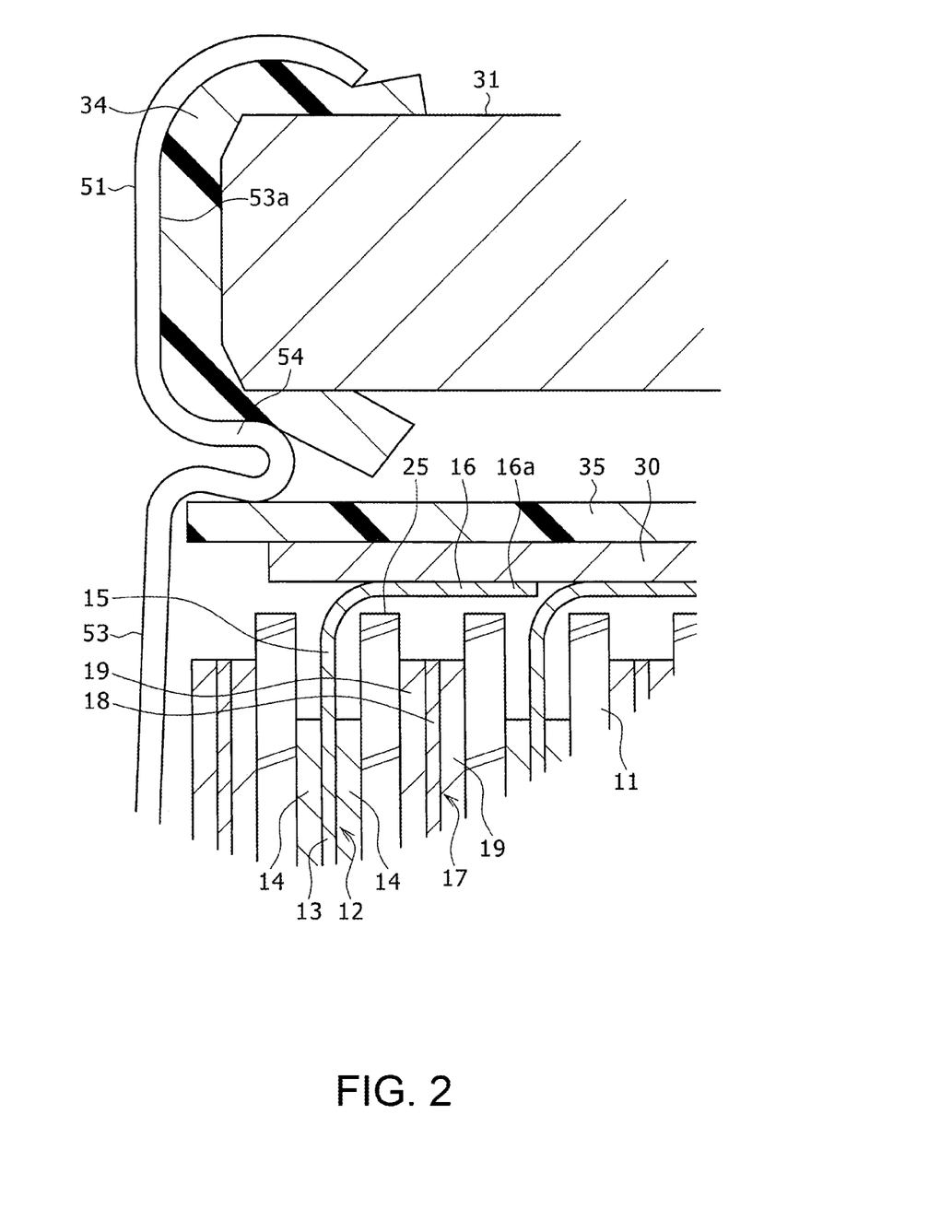
FIG. 2 is an enlarged view of part A in FIG. 1.
Figure 3:
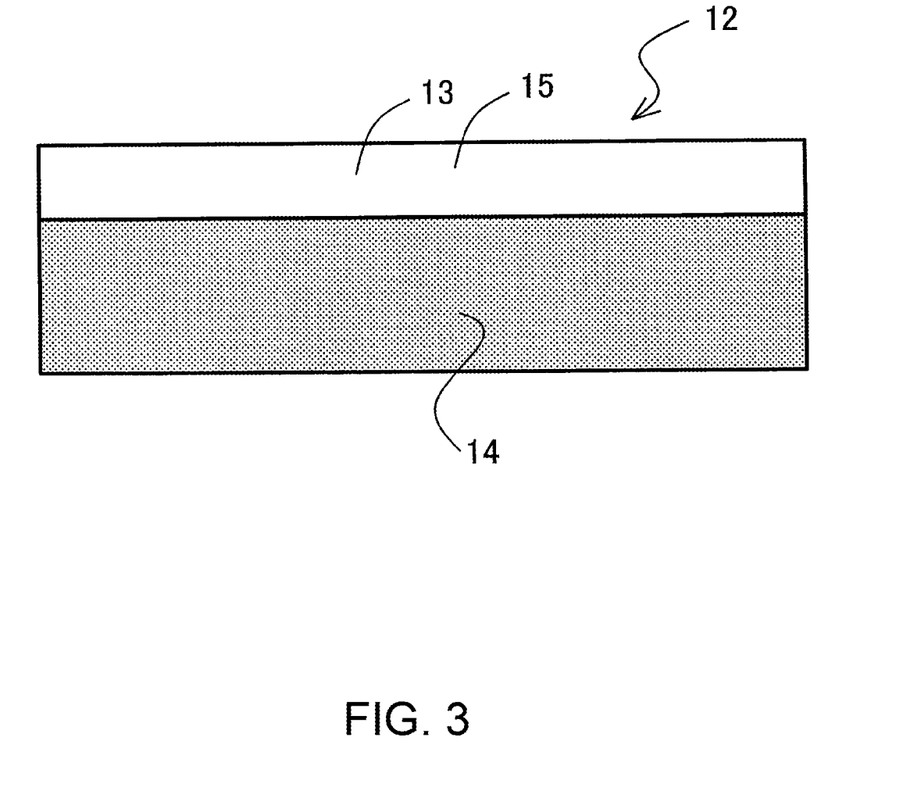
FIG. 3 is a diagram illustrating a positive electrode plate extracted from FIG. 1, in a developed state.

FIG. 1 is a sectional view of a cylindrical battery 10 according to an example of an embodiment. FIG. 2 is an enlarged view of part A in FIG. 1. FIG. 3 is a diagram illustrating a positive electrode plate 12 extracted from FIG. 1, in a developed state.

As illustrated in FIGS. 1 to 3 as an example, a cylindrical battery 10 includes a power generation element including a wound electrode body 11 and a non-aqueous electrolyte (not illustrated), and an outer covering can 51. In the following, the cylindrical battery 10 may be referred to as "battery 10". The wound electrode body 11 includes at least one positive electrode plate 12, at least one negative electrode plate 17 and a separator 25, and the positive electrode plate 12 and the negative electrode plate 17 are spirally Wound with the separator 25 therebetween. In the following, one side in an axis direction of the electrode body 11 may be referred to as "up" or "upper" and the other side in the axis direction of the electrode body 11 may be referred to as "down" or "lower". The non-aqueous electrolyte contains a non-aqueous solvent, and an electrolyte salt, such as a lithium salt, dissolved in the non-aqueous solvent. The non-aqueous electrolyte is not limited to a liquid electrolyte but may be a solid electrolyte using, e.g., a gel polymer. The positive electrode plate 12 corresponds to a first electrode plate and the negative electrode plate 17 corresponds to a second electrode plate.

The positive electrode plate 12 includes a band-like positive electrode core 13 formed of a conductive material, and the positive electrode core 13 is connected to a positive pole terminal 31 via a positive-electrode collector plate 30. Therefore, the positive electrode plate 12 includes a positive-electrode active material layer 14 formed on the positive electrode core 13. An edge portion on the positive pole terminal 31 side (upper edge portion in FIGS. 1 and 2) of the positive electrode core 13 is led out upward relative to an edge on the positive pole terminal 31 side of the positive-electrode active material layer 14 and thereby forms a first lead-out portion 15. The positive pole terminal 31 corresponds to a first pole terminal, the positive electrode core 13 corresponds to a first core and the positive-electrode active material layer 14 corresponds to a first active material layer.

The first lead-out portion 15 includes a first bent portion 16 bent toward the radially inner side of the electrode body 11. More specifically, the first bent portion 16 includes an upper end plate portion 16a spirally formed at an upper end by the first bent portion 16 being bent into an L-shape in cross-section over an entire length in a winding direction of the positive electrode core 13. Therefore, viewing the electrode body 11 from above, the part other than the positive electrode core 13 of the electrode body 11 is substantially covered by the spiral upper end plate portion 16a. As described later, the positive pole terminal 31 is in contact with the positive-electrode collector plate 30 and the upper end plate portion 16a is in contact with the positive pole terminal 31. Consequently, internal resistance of the battery 10 can be lowered.

The negative electrode plate 17 includes a band-like negative electrode core 18 formed of a conductive material, and the negative electrode core 18 is connected to a bottom portion 52 of the outer covering can 51. Therefore, the negative electrode plate 17 includes a negative-electrode active material layer 19 formed on the negative electrode core 18. An edge portion, on the bottom portion 52 side of the later-described outer covering can 51, (lower edge portion in FIG. 1) of the negative electrode core 18 is led out downward relative to an end on the bottom portion 52 side of the negative-electrode active material layer 19 and thereby forms a second lead-out portion 20. The negative electrode core 18 corresponds to a second core and the negative-electrode active material layer 19 corresponds to a second active material layer. As described later, the second lead-out portion 20 is in contact with the bottom portion 52 of the outer covering can 51, which serves as a negative pole terminal.

The positive pole terminal 31 is attached to an opening portion 53a of the outer covering can 51 via a gasket 34 formed of an insulating material, so as to close the opening portion 53a of the outer covering can 51. The outer covering can 51 and the positive pole terminal 31 form a metal battery case that accommodates the power generation element. The gasket 34 corresponds to a first insulating member.

The outer covering can 51 is a bottomed cylindrical metal container that includes the bottom portion 52 and accommodates the power generation element. The aforementioned gasket 34 is disposed between the outer covering can 51 and the positive pole terminal 31, ensuring sealing of the inside of the battery case and also ensuring insulation between the outer covering can 51 and the positive pole terminal 31. The outer covering can 51 includes a jutting portion 54 formed on a part on the opening portion 53a side so as to jut out to the radially inner side. For example, the jutting portion 54 is formed by pressing a side portion of the outer covering can 51 from outside. The jutting portion 54 is preferably formed annularly along a circumferential direction of the outer covering can 51, and supports the positive pole terminal 31 on an upper surface thereof via the gasket 34. The power generation element is received on the lower side relative to the jutting portion 54 in the outer covering can 51. The positive pole terminal 31 includes two substantially round projection portions 32, 33 formed at respective center portions of upper and lower surfaces of a disk portion. The projection portion 33 on the lower side of the two projection portions 32, 33 is in contact with an upper surface that is a second surface of the positive-electrode collector plate 30.

The outer covering can 51 is formed by processing a metal material into a bottomed cylindrical shape. A component material of the outer covering can 51 is, for example, copper, nickel, iron or any of alloys thereof, and is preferably iron or an iron alloy.

A ring-like insulating member 35 is disposed on the radially outer side of the upper surface of the positive-electrode collector plate 30. The insulating member 35 corresponds to a second insulating member.

The positive-electrode active material layer 14 of the positive electrode plate 12 is foil led, for example, on each of opposite surfaces of the positive electrode core 13. For the positive electrode core 13, for example, a foil of a metal that is stable in a positive electrode potential range, such as aluminum or a film with the metal disposed on a surface layer, is used. The positive electrode core 13 is preferably a foil of a metal that is stable in the positive electrode potential range such as a metal containing aluminum or an aluminum alloy as a main component.

The positive-electrode active material layer 14 preferably contains a positive-electrode active material, a conductive agent and a binder. The positive electrode plate 12 is fabricated by, for example, applying a positive-electrode mixture slurry containing solvents such as a positive-electrode active material, a conductive agent, a binder and N-methyl-2-pyrrolidone (NMP) to each of opposite surfaces of the positive electrode core 13 and then drying and rolling the positive electrode core 13.

An example of the positive-electrode active material can be a lithium-containing composite oxide containing a transition metal element such as Co, Mn or Ni. An example of the lithium-containing composite oxide can be, for example, $Li_xCoO_2$, $Li_xNiO_2$, $Li_xMnO_2$, $Li_xCo_yM_{1-y}O_z$, $Li_xNi_{1-y}M_yO_z$, $Li_xMn_2O_4$, $LiMPO_4$, $Li_2MPO_4F$ {$0<x\le1.2$, $0<y\le0.9$ and $2.0\le z\le2.3$ and M is at least one of Na, Mg, Sc, Y, Mn, Fe, Co, Ni, Cu, Zn, Al, Cr, Pb, Sb and B}.

Examples of the conductive agent include, e.g., carbon materials such as carbon black (CB), acetylene black (AB), ketjen black and black lead. Examples of the binder include, e.g., fluorine-based resins such as polytetrafluoroethylene (PTFE) and polyvinylidene fluoride (PVdF), polyacrylonitrile (PAN), polyimide (PI), acrylic-based resins and polyolefin-based resins. Also, any of these resins, and carboxymethyl cellulose (CMC) or a salt thereof or polyethylene oxide (PEO), may be used together. One of these materials may be used alone or two or more of the materials may be used in combination.

As illustrated in FIG. 3, the first lead-out portion 15 extending upward relative to an edge (upper edge in FIG. 3) of the positive-electrode active material layer 14 is formed at an edge portion (upper edge portion in FIG. 3) of the positive electrode core 13. The first lead-out portion 15 is formed of the positive electrode core 13 alone and can easily be bent due to having a small thickness and a low rigidity. The first bent portion 16 (FIG. 2) is formed by bending the first lead-out portion 15 in a thickness direction.

Referring back to FIG. 1, the negative-electrode active material layer 19 of the negative electrode plate 17 is formed on, for example, each of opposite surfaces of the negative electrode core 18. For the negative electrode core 18, for example, a foil of a metal that is stable in a negative electrode potential range, such as copper or a film with the metal disposed on a surface layer, is used.

The negative-electrode active material layer 19 preferably contains a negative-electrode active material and a binder. The negative-electrode active material layer 19 may contain a conductive agent as necessary. The negative electrode plate 17 is fabricated by, for example, applying a negative-electrode mixture slurry containing, e.g., a negative-electrode active material, a binder and water to each of opposite surfaces of the negative electrode core 18 and then drying and rolling the negative electrode core 18.

The negative-electrode active material is not specifically limited as long as the negative-electrode active material can reversely store and release lithium ions, and for example, natural black lead, artificial black lead, lithium, silicon, carbon, tin, germanium, aluminum, lead, indium, gallium, a lithium alloy, carbon or silicon with lithium absorbed in advance, or any alloy or mixture thereof, can be used. For the binder contained in the negative-electrode active material layer 19, for example, a resin that is similar to any of those for the positive electrode plate 12 is used. When the negative-electrode mixture slurry is prepared using a water-based solvent, styrene-butadiene rubber (SBR), CMC or a salt thereof, a polyacrylic acid or a salt thereof, polyvinyl alcohol, or the like can be used. One of these materials can be used alone, or two or more of the materials can be used in combination.

The second lead-out portion 20 extending downward relative to an edge (lower edge in FIG. 1) of the negative-electrode active material layer 19 is formed on an edge portion (lower edge portion in FIG. 1) of the negative electrode core 18. The second lead-out portion 20 is formed using the negative electrode core 18 alone, and can easily be bent due to having a small thickness and a low rigidity. A second bent portion 21 is formed by bending the second lead-out portion 20 in a thickness direction. The second bent portion 21 is in contact with an inner surface of the bottom portion 52 of the outer covering can 51. Consequently, the internal resistance of the battery 10 can be lowered. The second lead-out portion 20 will be described in detail later.

For the separator 25, a porous sheet having ion permeability and an insulation property is used. Specific examples of the porous sheet include, e.g., a microporous thin film, a woven fabric and a non-woven fabric. A material of the separator 25 is preferably cellulose or an olefin resin such as polyethylene or polypropylene. The separator 25 may be a stack including a cellulose fiber layer and a thermoplastic resin fiber layer of, e.g., an olefin-based resin.

For the non-aqueous solvent for the electrolyte, for example, any of esters, ethers, nitriles such as acetonitrile, amides such as dimethylformamide and mixtures of two or more of these solvents can be used. The non-aqueous solvent may contain a halogen substitution product formed by substituting hydrogen of any of these solvents with a halogen atom such as fluorine.

In the present embodiment, a lower surface that is a first surface of the positive-electrode collector plate 30 is in contact with an upper surface that is a surface on the positive pole terminal 31 side of the first bent portion 16 (FIG. 2) of the positive electrode plate 12. Here, a configuration in which the first bent portion 16 and the positive-electrode collector plate 30 are not welded to each other may be employed. The positive-electrode collector plate 30 is formed in a disk-like shape using a metal plate such as a steel plate or a copper plate, which is a conductive material. In the positive-electrode collector plate 30, a liquid injection hole for injecting an electrolytic solution from the opening portion 53a side of the positive-electrode collector plate 30 into space on the electrode body 11 side may be formed at least one position. Then, as a result of a lower surface of the projection portion 33 on the lower side of the positive pole terminal 31 being in contact with the upper surface of the positive-electrode collector plate 30, the positive pole terminal 31 is in direct contact with the positive-electrode collector plate 30. An end portion on the opening portion 53a side of the outer covering can 51 is swaged radially inwardly to an outer circumferential portion of an upper end of the positive pole terminal 31 via the gasket 34. Consequently, the positive pole terminal 31 is fixed in the opening portion 53a of the outer covering can 51.

Furthermore, the insulating member 35 and the positive-electrode collector plate 30 are held between the first bent portion 16 of the positive electrode plate 12 and the jutting portion 54. The positive pole terminal 31 is connected to the positive-electrode collector plate 30 through the inside of a through-hole 36 extending through the insulating member 35 in an up-down direction.

Also, the second lead-out portion 20 of the negative electrode plate 17 includes the second bent portion 21 bent toward the radially inner side of the electrode body 11. More specifically, the second bent portion 21 includes a lower end plate portion 22 spirally formed at a lower end by the second bent portion 21 being bent into an L-shape in cross-section over an entire length in a winding direction of the negative electrode core 18. Therefore, viewing the electrode body 11 from beneath, the part other than the negative electrode core 18 of the electrode body 11 is substantially covered by the spiral lower end plate portion 22. A lower surface that is a surface, on the bottom portion 52 side of the outer covering can 51, of the lower end plate portion 22 is in contact with the inner surface of the bottom portion 52. Consequently, the area of connection between the negative electrode plate 17 and the outer covering can 51 that serves as a negative pole terminal is large. For example, the second bent portion 21 formed over the entire length in the winding direction of the negative electrode core 18 and the inner surface of the bottom portion 52 of the outer covering can 51 can be brought into wide surface contact with each other. Consequently, the internal resistance of the battery 10 can be lowered.

The above battery 10 enables connection of the first bent portion 16 of the positive electrode core 13 to the positive pole terminal 31 via the positive-electrode collector plate 30 in a configuration in which the positive electrode core 13 of the positive electrode plate 12 is thin and low in rigidity. Here, the area of contact between the first bent portion 16 and the positive-electrode collector plate 30 and the area of contact between the positive-electrode collector plate 30 and the positive pole terminal 31 can be made large. For example, the first bent portion 16 formed over the entire length in the winding direction of the positive electrode core 13 and the positive-electrode collector plate 30 can be brought into wide surface contact with each other. Consequently, the internal resistance of the battery 10 can be lowered. Also, the lower surface of the positive-electrode collector plate 30 just needs to be brought into contact with the upper surface of the first bent portion 16 formed at the edge portion on the positive pole terminal 31 side of the positive electrode core 13, and thus, there is no need to use a thick and highly rigid positive electrode core. Note that the first bent portion 16 of the positive electrode core 13 and the positive-electrode collector plate 30 may be welded to each other via, e.g., resistance welding, ultrasonic welding or laser welding.

Also, since the lower surface of the second bent portion 21 of the negative electrode plate 17 is in wide contact with the inner surface of the bottom portion 52 of the outer covering can 51, the internal resistance can be lowered on both the positive electrode side and the negative electrode side in a balanced manner.

Figure 4:
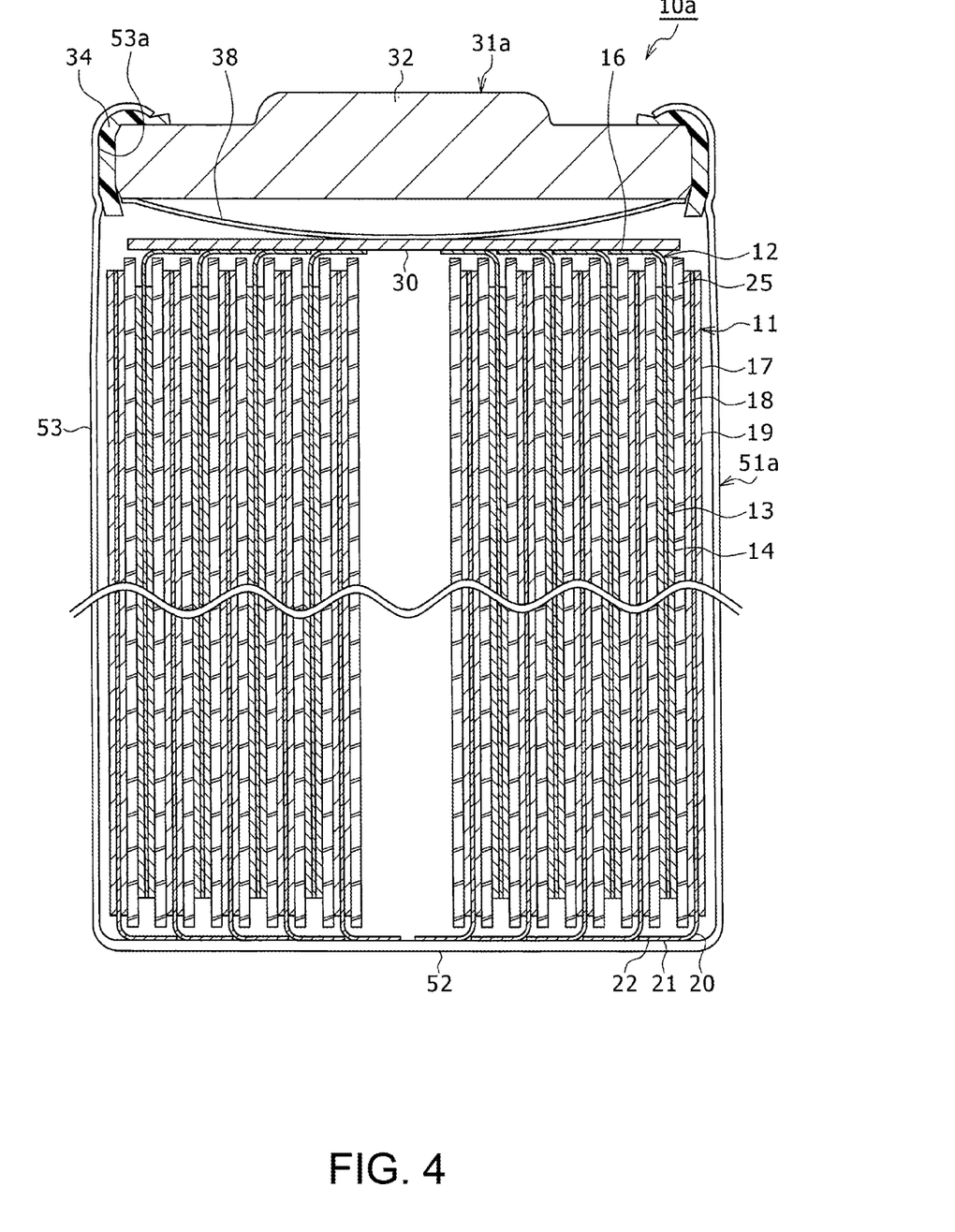
FIG. 4 is a sectional view of a cylindrical battery according to another example of the embodiment.

FIG. 4 is a sectional view of a battery 10a according to another example of the embodiment. In the battery 10a of the present example, unlike the configuration in FIGS. 1 to 3, no lower-side projection portion is formed at a lower surface of a positive pole terminal 31a, and instead the lower surface of the positive pole terminal 31a is an entirely flat surface.

A leaf spring 38 that serves as a conductive member is disposed between the lower surface of the positive pole terminal 31a and an upper surface of a positive-electrode collector plate 30. The leaf spring 38 is formed of a metal material and has a dish-like shape that is round when viewed from above, and includes a center portion recessed downward.

In the outer covering can 51a, no jutting portion that juts out largely toward the radially inner side is formed. A part on the opening portion 53a side of an outer covering can 51a is swaged from the radially outer side to the radially inner side with a positive pole terminal 31a disposed in an end portion, on the opening portion 53a side of the cylinder portion 53, of the outer covering can 51a via a gasket 34. Also, the end portion on the opening portion 53a side of the outer covering can 51a is swaged radially inwardly to an outer circumferential portion of an upper end of the positive pole terminal 31a via the gasket 34. Consequently, the positive pole terminal 31a is fixed in the opening portion 53a of the outer covering can 51a. In this state, an outer circumferential portion of the lower surface of the positive pole terminal 31a is pressed against an outer circumferential portion of an upper surface of the leaf spring 38, and a center portion of the upper surface of the positive-electrode collector plate 30 is pressed against a center portion of a lower surface of the leaf spring 38. Consequently, the leaf spring 38 is compressed from the opposite sides in an up-down direction and a spring force of the leaf spring 38 is applied to the positive-electrode collector plate 30 and the positive pole terminal 31a. Therefore, the lower surface of the positive-electrode collector plate 30 is in contact with an upper surface of a first bent portion 16 of a positive electrode core 13 and the positive pole terminal 31a is electrically connected to the upper surface of the positive-electrode collector plate 30 via the leaf spring 38. In this way, where the positive pole terminal 31a is attached to the opening portion 53a by the part on the opening portion 53a side of the outer covering can 51a being swaged from the radially outer side to the radially inner side, the outer covering can 51a is deformed because of what is called "transverse swaging". In this case, no force in a direction in which the positive-electrode collector plate 30 is pressed against an electrode body 11 is applied to the positive-electrode collector plate 30 by the outer covering can 51a alone. On the other hand, disposing the leaf spring 38 between the positive pole terminal 31a and the positive-electrode collector plate 30 as described above enables a force in a direction in which the positive-electrode collector plate 30 is pressed against the electrode body 11 to be applied to the positive-electrode collector plate 30 by the positive pole terminal 31a and the leaf spring 38. In the present example, the remaining configuration and operation are similar to those of the configuration in FIGS. 1 to 3.

Figure 5:
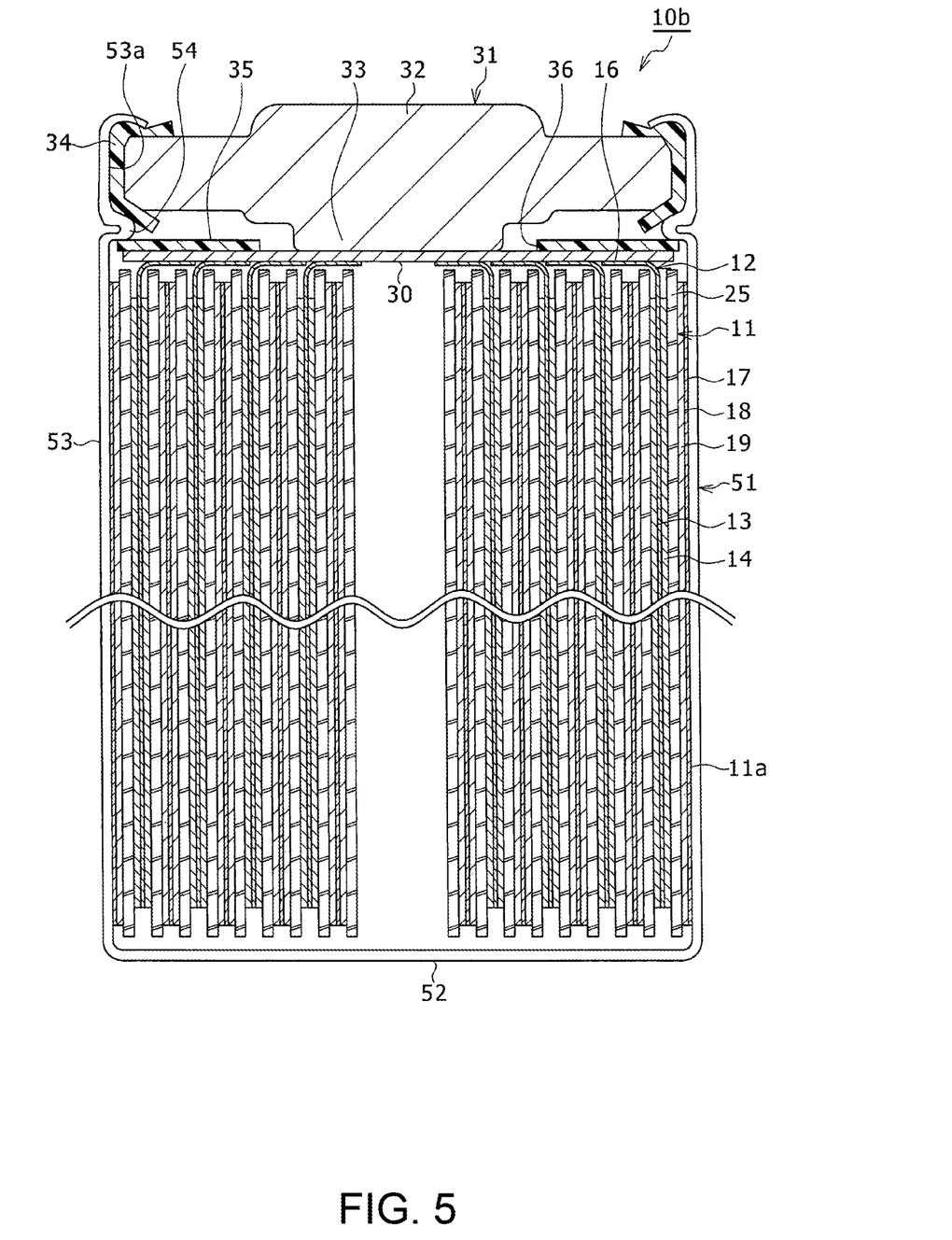
FIG. 5 is a sectional view of a cylindrical battery according to another example of the embodiment.

FIG. 5 is a sectional view of a battery 10b according to another example of the embodiment. In the battery 10b of the present example, unlike the configuration in FIGS. 1 to 3, an edge portion, on the bottom portion 52 side of the outer covering can 51 (lower edge portion in FIG. 5) of a negative electrode core 18 is not led out downward relative to an edge on the bottom portion 52 side (lower edge in FIG. 5) of the negative-electrode active material layer 19. On the other hand, the negative electrode core 18 is exposed at an outermost circumferential surface of an electrode body 11. Therefore, in the negative electrode plate 17a, a core exposed portion 11a with no negative-electrode active material layer formed thereon is disposed in an end portion on the winding-end side of a first surface that is the outermost circumferential surface of the electrode body 11. Then, the core exposed portion 11a, which is a part in which the negative electrode core 18 is exposed at the outermost circumferential surface of the electrode body 11, is in contact with an inner surface of a cylinder portion 53 of an outer covering can 51. Consequently, the negative electrode core 18 and the outer covering can 51 that serves as a negative pole terminal can be brought into wide surface contact with each other, and thus, internal resistance of the battery 10 can be lowered. Also, because the internal resistance can also be lowered on the positive electrode side, the internal resistance can be lowered on both the positive electrode side and the negative electrode side in a balanced manner. Forming the core exposed portion 11a at substantially the entire circumference of the outermost circumference surface of the electrode body 11 is preferable from the perspective of lowering the internal resistance. In this present example, the remaining configuration and operation are similar to those of the configuration in FIGS. 1 to 3.

In each of the above examples, a case where a first lead-out portion 16 of a positive electrode core 13 is bent toward the radially inner side of an electrode body 11 has been described, and in the configuration of some of the above examples, a case where a second lead-out portion 20 of a negative electrode core 18 is bent toward the radially inner side of an electrode body 11 has been described. However, a configuration in which one or both of a first lead-out portion of a positive electrode core 13 and a second lead-out portion of a negative electrode core 18 are bent toward the radially outer side of an electrode body 11 may be employed.

In each of the above examples, a first electrode plate is a positive electrode plate and a second electrode plate is a negative electrode plate. However, a first electrode plate may be a negative electrode plate and a second electrode plate may be a positive electrode plate. For example, the configuration of the present disclosure is also applicable to the configuration in FIGS. 1 to 3 in which a negative pole terminal is attached to the opening portion 53a of the outer covering can 51, and a part of the positive electrode core 13 in the positive electrode plate 12 that extends relative to a lower edge that is a first edge of the positive-electrode active material layer is connected to the inner surface of the bottom portion of the outer covering can.

REFERENCES SIGNS LIST 10, 10a cylindrical battery (battery), 11 electrode body, 12 positive electrode plate, 13 positive electrode core, 14 positive-electrode active material layer, 15 first lead-out portion, 16 first bent portion, 16a upper end plate portion, 17 negative electrode plate, 18 negative electrode core, 19 negative-electrode active material layer, 20 second lead-out portion, 21 second bent portion, 22 lower end plate portion, 25 separator, 30 positive-electrode collector plate, 31, 31a positive pole terminal, 32, 33 projection portion, 34 gasket, 35 insulating member, 36 through-hole, 38 leaf spring, 51, 51a outer covering can, 52 bottom portion, 53 cylinder portion, 53a opening portion, 54 jutting portion

The invention claimed is:

1. A cylindrical battery comprising:
a wound electrode body including at least one first electrode plate and at least one second electrode plate that are wound with a separator therebetween;
a bottomed cylindrical outer covering can that accommodates the electrode body; and
a first pole terminal attached to an opening portion of the outer covering can via a first insulating member so as to close the opening portion, wherein
the first electrode plate includes a first core being formed of a first conductive material and a first active material layer formed on the first core, with an edge portion of the first core on a first pole terminal side being led out relative to an edge of the first active material layer on the first pole terminal side to thereby form a first lead-out portion,
the first lead-out portion includes a first bent portion bent radially inward toward a center of the electrode body or radially outward toward the covering can of the electrode body
a first surface of a first electrode collector plate is in contact with a surface of the first bent portion on the first pole terminal side, and the first pole terminal is directly connected to a second surface of the first electrode collector plate,
wherein:
the outer covering can includes a jutting portion at a part on an opening portion side, the jutting portion being formed radially inward from a cylinder portion of the outer covering can;
a ring-like second insulating member is provided on a radially outer side of the second surface of the first electrode collector plate;
the first pole terminal includes an outer projection portion and an inner projection portion that are formed at respective center portions of outer and inner surfaces of a disk portion, the first pole terminal having, at a center portion thereof, a thickness that is greater than a thickness at a part of the first pole terminal on a radially outer side; and
the second insulating member and the first electrode collector plate are held between the first bent portion and the jutting portion, and the inner projection portion of the first pole terminal is connected to the first electrode collector plate through an inner side of a through-hole of the second insulating member.

2. The cylindrical battery according to claim 1, wherein the first pole terminal is attached to the opening portion via the first insulating member by a part of the outer covering can on the opening portion side being swaged radially inward.

3. The cylindrical battery according to claim 1, wherein:
the second electrode plate includes a second core being formed of a second conductive material, and a second active material layer formed on the second core, with a second lead-out portion being formed by an edge portion of the second core on a bottom portion side of the outer covering can being led out relative to an edge of the second active material layer on the bottom portion side;
the second lead-out portion includes a second bent portion bent radially inward toward the center of the electrode body or radially outward toward the covering can of the electrode body; and
the second bent portion is in contact with an inner surface of the bottom portion side.

4. The cylindrical battery according to claim 1, wherein:
the second electrode plate includes a second core being formed of a second conductive material, and a second active material layer formed on the second core, with the second core being exposed in an outermost circumferential surface of the electrode body; and
a part at which the second core is exposed in the outermost circumferential surface of the electrode body is in direct contact with an inner surface of a cylinder portion of the outer covering can.

* * * * *